US011967692B2

(12) United States Patent
Grass

(10) Patent No.: US 11,967,692 B2
(45) Date of Patent: Apr. 23, 2024

(54) COOLING SEGMENT FOR CONTROLLING THE TEMPERATURE OF A BATTERY MODULE OF A MOTOR VEHICLE BATTERY

(71) Applicant: Dr. Ing. h.c. F. Porsche Aktiengesellschaft, Stuttgart (DE)

(72) Inventor: Dominik Grass, Bietigheim-Bissingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 122 days.

(21) Appl. No.: 17/474,259

(22) Filed: Sep. 14, 2021

(65) Prior Publication Data
US 2022/0102777 A1    Mar. 31, 2022

(30) Foreign Application Priority Data
Sep. 30, 2020    (DE) ..................... 10 2020 125 498.9

(51) Int. Cl.
*H01M 10/6556* (2014.01)
*B60L 58/26* (2019.01)
(Continued)

(52) U.S. Cl.
CPC ......... *H01M 10/6556* (2015.04); *B60L 58/26* (2019.02); *H01M 10/613* (2015.04);
(Continued)

(58) Field of Classification Search
CPC ........... H01M 10/6556; H01M 10/613; H01M 10/625; H01M 50/204; H01M 50/249;
(Continued)

(56) References Cited

U.S. PATENT DOCUMENTS 10,374,270 B2    8/2019  Drabon et al.
2018/0375179 A1* 12/2018  King ................. H01M 10/6555
(Continued)

FOREIGN PATENT DOCUMENTS

CN    2696126 Y  *  4/2005
CN    110137617 A  *  8/2019    .......... H01M 10/613
(Continued)

OTHER PUBLICATIONS

Machine translation of CN-110137617-A. Obtained from PE2E search on Mar. 7, 2023 (Year: 2019).*
(Continued)

*Primary Examiner* — Lingwen R Zeng
(74) *Attorney, Agent, or Firm* — Buchanan Ingersoll & Rooney PC

(57) ABSTRACT

A cooling segment for controlling the temperature of a battery module of a motor vehicle battery. The cooling segment includes an inflow channel for feeding of a cooling fluid, an outflow channel for discharge of the cooling fluid, which runs spaced apart from the inflow channel, and a plurality of cooling channels which communicate with the inflow channel and the outflow channel. The respective cooling channel has a first channel portion which is connected directly to the inflow channel and which partially runs to the outflow channel. A second channel portion is connected directly to the first channel portion and runs away from the outflow channel and partially toward the inflow channel. A final portion is connected directly or indirectly to the second channel portion and connected directly to the outflow channel.

16 Claims, 3 Drawing Sheets

(51) Int. Cl.
*H01M 10/613* (2014.01)
*H01M 10/625* (2014.01)
*H01M 10/6554* (2014.01)
*H01M 50/204* (2021.01)
*H01M 50/249* (2021.01)
*H01M 10/6567* (2014.01)

(52) U.S. Cl.
CPC ..... *H01M 10/625* (2015.04); *H01M 10/6554* (2015.04); *H01M 50/204* (2021.01); *H01M 50/249* (2021.01); *H01M 10/6567* (2015.04); *H01M 2220/20* (2013.01); *Y02E 60/10* (2013.01); *Y02T 10/70* (2013.01)

(58) Field of Classification Search
CPC ......... H01M 2220/20; H01M 10/6554; H01M 10/6567; B60L 58/26; Y02E 60/10; Y02T 10/70
See application file for complete search history.

(56) References Cited

U.S. PATENT DOCUMENTS

2020/0136214 A1  4/2020  Graves et al.
2022/0247012 A1* 8/2022  Scholemann ....... H01M 10/625

FOREIGN PATENT DOCUMENTS

DE   102008034885 A1   1/2010
DE   102019216443 A1   4/2020

OTHER PUBLICATIONS

Machine translation of CN-2696126-Y. Obtained from PE2E search on Mar. 7, 2023 (Year: 2005).*

* cited by examiner

COOLING SEGMENT FOR CONTROLLING THE TEMPERATURE OF A BATTERY MODULE OF A MOTOR VEHICLE BATTERY

CROSS-REFERENCE TO RELATED APPLICATION

This application claims priority to German Patent Application No. 10 2020 125 498.9, filed Sep. 30, 2020, the content of such application being incorporated by reference herein in its entirety.

FIELD OF THE INVENTION

The invention relates to a cooling segment, with the aid of which battery cells of a battery module for a motor vehicle battery can be temperature-controlled, in particular cooled. The invention also relates to a battery module unit and to a motor vehicle battery having such a cooling segment.

BACKGROUND OF THE INVENTION

DE 10 2019 216 443 A1 and DE 10 2008 034 885 A1, which are each incorporated by zo reference herein have in each case disclosed a base of a motor vehicle battery that is designed as a cooling plate for cooling battery cells by way of U-shaped cooling channels, in the case of which base an inflow and an outflow of the cooling channels are provided adjacent to one another on the same side of the base.

There is a constant requirement for controlling the temperature of a motor vehicle battery as efficiently as possible.

SUMMARY OF THE INVENTION

In view of the above, described herein are measures which make possible efficient temperature control of a motor vehicle battery.

One aspect of the invention relates to a cooling segment for controlling the temperature of a battery module of a motor vehicle battery, having an inflow channel for feeding of a cooling fluid, an outflow channel for discharge of the cooling fluid, which runs spaced apart from the inflow channel, and a plurality of cooling channels which communicate with the inflow channel and the outflow channel, wherein the respective cooling channel has a first channel portion which is connected directly to the inflow channel and which partially runs to the outflow channel, a second channel portion which is connected directly to the first channel portion and which runs away from the outflow channel and partially toward the inflow channel, and a final portion which is connected directly or indirectly to the second channel portion and connected directly to the outflow channel.

The cooling segment may in particular be integrated in a plate which forms a side wall or a base or a ceiling of a preferably cuboidal housing of the battery module, wherein battery cells, which are designed in particular as pouch cells, may be inserted into the housing, said battery cells being able to be coupled thermally to the cooling segment on one side. Here, however, the cooling channel provided for exchange of heat with the battery cells does not run along the battery cells in a rectilinear manner. Instead, the cooling fluid branched off from the inflow channel flows in the first channel portion in one direction and, at the transition into the second channel portion, is diverted with a component in the opposite direction before, after a further diversion into the final channel portion, the cooling fluid flows substantially in the original direction, predefined by the first channel portion, again. In this way, the cooling fluid can be diverted at least twice in the cooling channel. It is in principle possible for the cooling fluid to be diverted exactly twice in the cooling channel, so as to keep a pressure loss in the cooling channel low. The diversion of the cooling channels gives rise to a flow of heat within the cooling segment, since a channel with relatively cool cooling medium is always situated next to a channel with relatively warm cooling medium. Due to the proximity of the channel portions flowed through in opposite directions, it is also possible for transport of heat between the adjacent channel portions transverse to the flow direction to be realized more easily. In this way, a more homogeneous temperature distribution is formed overall. However, it is also possible to provide in the cooling channel an even number of diversions exceeding two, in particular if a delivery rate for delivering the cooling fluid can compensate the associated pressure loss. In principle, it is also possible to design the cooling channels without any diversions in that, for example, provision is made of a plurality of cooling channels which run substantially parallel to one another and which are each connected to the inflow channel and the outflow channel. Due to the diversion of the cooling fluid in the cooling channel, a laminar boundary layer within the cooling channel can be broken up and the turbulence of the flow within the cooling channel can be increased. A degree of turbulence increased by way of the diversions results in considerable mixing of the cooling fluid transversely to the flow direction, whereby the convective heat transfer between the cooling fluid and the battery cells can be improved and a cooling or heating performance can be increased. In this case, the pressure loss caused by the diversions within the cooling channel is generally so low that the pressure loss can be compensated by the delivery rate of a delivery device, in particular a delivery pump. In comparison with a relatively large number of rectilinear cooling channels which run parallel one next to the other and which depart perpendicularly from the inflow channel, the total pressure loss in the case of a relatively small number of cooling channels formed between the inflow channel and the outflow channel and provided with diversions ought to be comparably high. Due to the diversions in the cooling channel, the heat exchange performance can be increased significantly, and/or better homogenization of the temperature distribution can be achieved, so that efficient temperature control of a motor vehicle battery is made possible.

The first channel section, the second channel section and the final channel section may have an identical cross section of flow and run in particular substantially rectilinearly, wherein the first channel section and the second channel section, on the one hand, and the second channel section and the final channel section, on the other hand, are connected to one another over an angle. The angle is preferably configured as an acute angle of less than 90°, with the result that the cooling fluid is diverted at the connection points through more than 270°. The angle between the channel portions is preferably 45°±10°. The three-dimensional structure of the cooling channel may, preferably together with the inflow channel and the outflow channel, be formed by a correspondingly shaped profile, wherein the open side of the profile is closed off in a fluid-tight manner by a cover. The profile may, for example, be produced from a metal, in particular a metal sheet, or a plastic. The cooling channel may in particular have a rectangular or trapezoidal cross section of flow. Particularly preferably, the shaped profile is fastened to a base plate, acting as cover, of the housing of the battery module so as to form the cooling segment together with the base plate. The base plate is in particular produced from a metallic material, so as to provide the lowest possible heat conduction resistance between the cooling fluid and the battery cells. Preferably, the profile has a higher heat conduction resistance than the base plate, in order to reduce an undesired exchange of heat with the surroundings.

In particular, the respective cooling channel has at least one, in particular exactly one, zigzag profile. The zigzag-shaped configuration of the cooling channel can allow multiple diversions of the cooling fluid with a small extent of the cooling channel transverse to the flow direction of the first channel portion and of the final channel portion, whereby a correspondingly high degree of turbulence of the flow of the cooling fluid within the cooling channel can be achieved.

Preferably, the inflow channel and the outflow channel run, spaced apart from one another, substantially parallel to one another, wherein the first channel portion and the final channel portion of the respective cooling channel run, spaced apart from one another, substantially parallel to one another, and the second channel portion runs at an angle to the inflow channel and the outflow channel and to the first channel portion and the final channel portion. The inflow channel and the outflow channel may substantially follow the in particular rectangular arrangement of the battery cells, in particular on the longitudinal sides, wherein the inflow channel and the outflow channel may in particular be provided outside the battery cells. The first channel portion and the second channel portion may project from the inflow channel or from the outflow channel at an identical angle, wherein, in particular, the first channel portion and the second channel portion project substantially at a right angle from the inflow channel or from the outflow channel. The second portion, running at an angle, can bridge the lateral spacing between the first channel portion and the final channel portion and provide the diversions for the first channel portion and the final channel portion. Here, the second channel portion may in particular be at such an angle that the lateral offset of the first portion from the final portion can be minimized and the extent of the first channel portion and the final channel portion can be maximized.

Particularly preferably, the inflow channel, the outflow channel and the cooling channels are formed substantially in a plane. In this way, the cooling segment can be configured as a separate structural unit which can be installed as a housing wall, in particular as a base plate, in the housing of the battery module. The number of components and the structural space requirement can thus be kept low.

A further aspect of the invention relates to a battery module unit for a motor vehicle battery, having a housing and a plurality of battery cells which are inserted in the housing and which are designed in particular as pouch cells, wherein a wall in thermal contact with the battery cells, in particular a base plate, of the housing has a cooling segment, which may be designed and refined as described above, wherein the respective cooling channel of the cooling segment is coupled thermally to all the battery cells. Due to the diversions in the cooling channel, the heat exchange performance can be increased significantly, and/or better homogenization of the temperature distribution can be achieved, so that efficient temperature control of a motor vehicle battery is made possible.

In particular, the inflow channel and the outflow channel are formed offset from the battery cells. The exchange of heat between the cooling fluid and the battery cells is thus realized only via the cooling channels, which communicate with the inflow channel and the outflow channel. Since the inflow channel and the outflow channel are not arranged in an areal region occupied by the battery cells, the cooling channels can more easily cool all the battery cells arranged in said areal region. For example, the respective cooling channel can laterally project slightly beyond said areal region, whereby the heat exchange performance of the cooling channel can be improved.

Preferably, the first channel portion, the second channel portion and the final channel portion are coupled thermally to all the battery cells. The cooling fluid can be diverted at the edge of an areal region occupied by the battery cells to such an extent that, not only the cooling channel as a whole, but also the respective channel portions are guided along all the battery cells of the battery module. In this way, the temperature control of the battery cells can be realized particularly homogeneously.

A further aspect of the invention relates to a motor vehicle battery for an in particular electrically driveable motor vehicle, having a plurality of battery module units, which may be designed and refined as described above, which are arranged in rows and/or in columns. In particular, the battery modules are arranged one behind the other transversely to the flow direction of the inflow channel and of the outflow channel and/or in the flow direction of the inflow channel and of the outflow channel. Due to the diversions in the cooling channel, the heat exchange performance can be increased significantly, and/or better homogenization of the temperature distribution can be achieved, so that efficient temperature control of a motor vehicle battery is made possible.

In particular, a plurality of inflow channels is connected to a supply flow collector channel, which runs in particular transversely to the flow direction of the inflow channels, and/or a plurality of outflow channels is connected to a return flow collector channel, which runs in particular transversely to the flow direction of the outflow channels. Preferably, the supply flow collector channel and the return flow collector channel are spaced apart from one another in the flow direction of the inflow channels via the at least one battery module unit provided therebetween, wherein, in particular, the supply flow collector channel and the return flow collector channel are provided substantially on different sides of the motor vehicle battery, which sides face away from one another. Particularly preferably, the supply flow collector channel and the return flow collector channel have the same flow direction.

Preferably, it is provided that battery module units provided in each case adjacent to one another transversely to the flow direction of the inflow channel and of the outflow channel share the same inflow channel or the same outflow channel. The number of components and the structural space requirement can thus be kept low. Here, the battery module units provided one next to the other transversely to the flow direction of the inflow channel and of the outflow channel may be of mirror-symmetrical form in relation to one another with respect to the common inflow channel or with respect to the common outflow channel.

Particularly preferably, it is provided that battery module units provided in each case adjacent to one another in the flow direction of the inflow channel and of the outflow channel share both the same inflow channel and the same outflow channel. A rectilinearly running inflow channel can thus supply cooling fluid to the plurality of cooling channels of the respective cooling segment of the plurality of battery module units arranged one behind the other in the flow direction. Correspondingly, a rectilinearly running outflow channel can thus discharge the cooling fluid from the plurality of cooling channels of the respective cooling segment of the plurality of battery module units arranged one behind the other in the flow direction. The number of components and the structural space requirement can thus be kept low.

BRIEF DESCRIPTION OF THE DRAWINGS

The invention is explained below by way of example with reference to the appended drawings on the basis of preferred exemplary embodiments, wherein the features presented below may in each case individually or in combination represent an aspect of the invention. In the drawings.

DETAILED DESCRIPTION OF THE INVENTION

Figure 1:
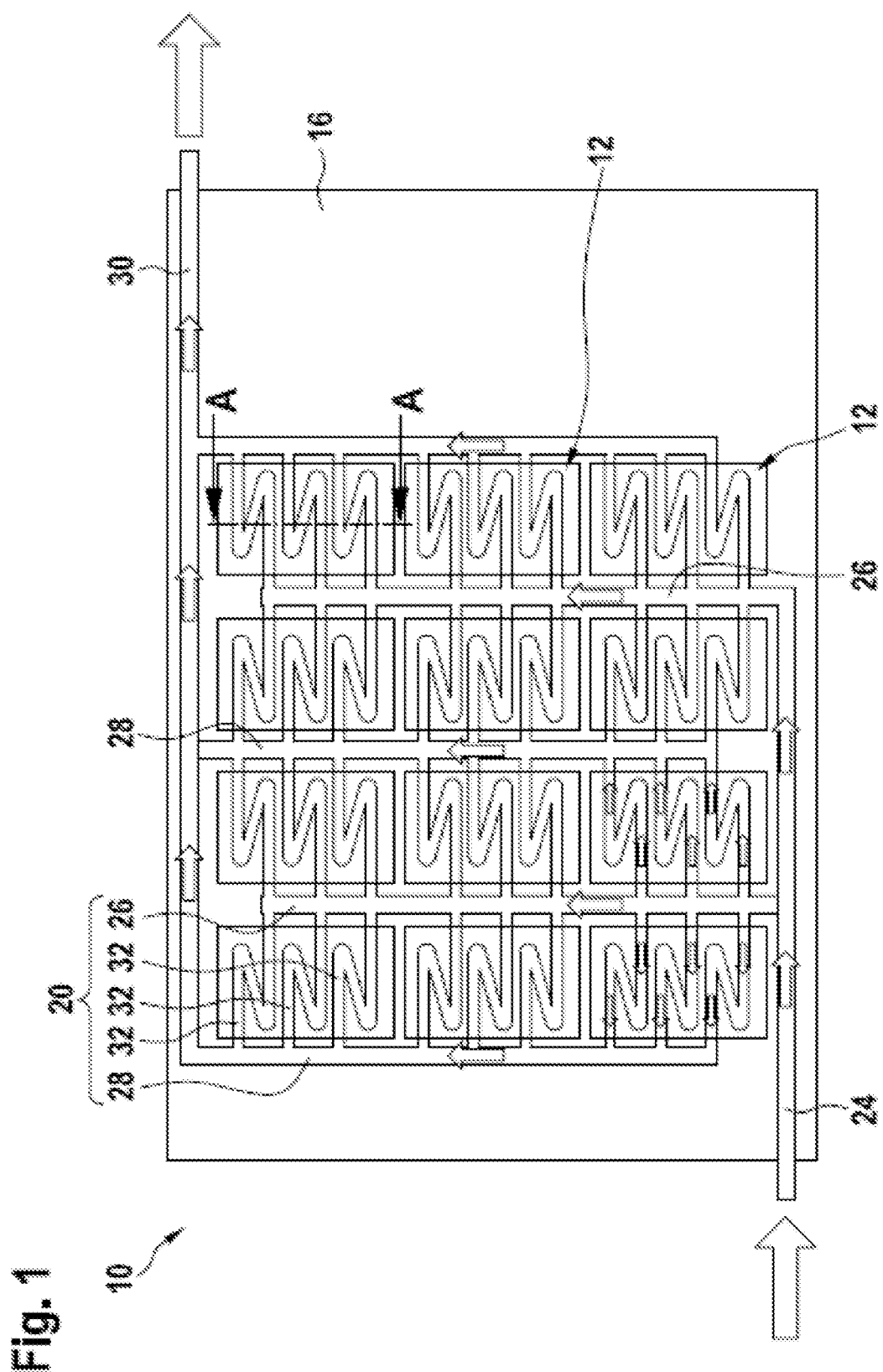
FIG. 1 shows a schematic plan view of a temperature-controlled motor vehicle battery.
Figure 4:
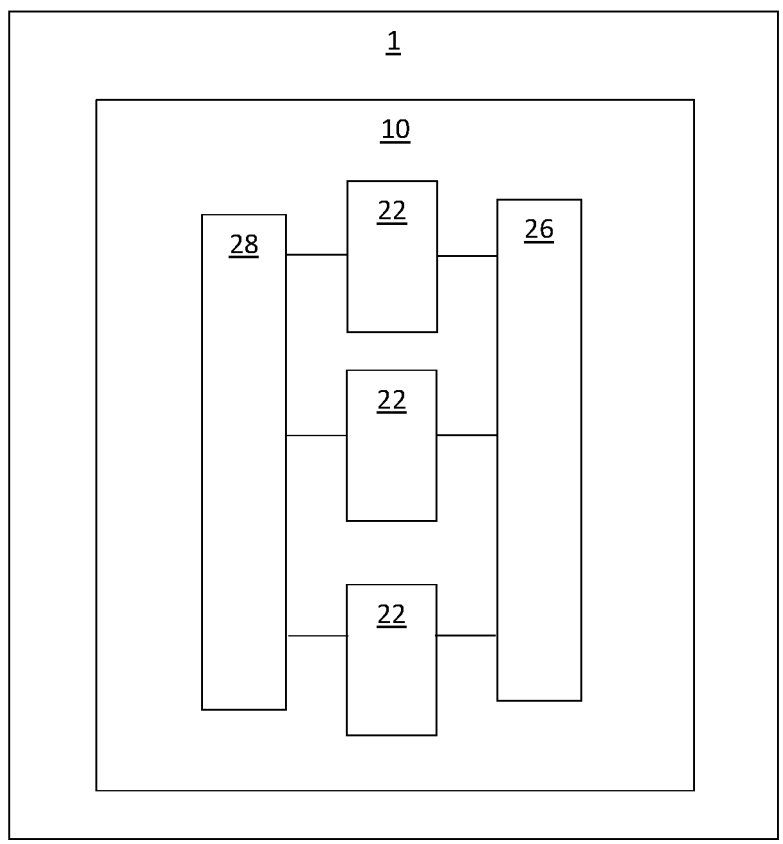
FIG. 4 shows battery module units, which are arranged adjacent to one another in the flow direction of the inflow channel and of the outflow channel, that share both the same inflow channel and the same outflow channel.

The motor vehicle battery 10 illustrated partially and in simplified form in FIGS. 1 and 4 can be used in particular for purely electric drive of a motor vehicle 1. The motor vehicle battery 10 has a plurality of separate, interconnected battery modules 12, which have a plurality of battery cells 14. The battery cells 14 are designed in particular as pouch cells, which can be arranged one behind the other in plate-shaped form and can bear with their respective downwardly facing narrow side on a base plate 16 of a housing 18. The substantially identically designed battery modules 12 are arranged in rows and columns in a regular manner, in particular in alignment with one another. For optimum operation of the motor vehicle battery 10, the battery cells 14 are to be operated in an optimum temperature range, and so, for this purpose, the battery cells 14 are to be heated and/or cooled, that is to say temperature-controlled. Heating of the battery cells 14 is generally intended only during a cold start of the motor vehicle, wherein, during ongoing operation of the motor vehicle, cooling of the battery cells 14 is generally a priority.

In the illustrated exemplary embodiment, each battery module 12 is assigned a cooling segment 20. The cooling segment 20 is integrated in the base plate 16 of the housing 18 and forms together with the battery module 12 a battery module unit 22, whose battery cells 14 can be temperature-controlled by the assigned cooling segment 20. The cooling fluid provided for controlling the temperature, in particular cooling, the battery cells 14 is fed via a supply flow collector channel 24 provided for the entire motor vehicle battery 10.

The supply flow collector channel 24 may be formed on an edge of the base plate 16 and run outside the battery module units 22. Departing, in particular substantially perpendicularly, from the supply flow collector channel 24 are inflow channels 26 which run parallel to one another and between which in each case two columns of battery modules 12 are provided. Between those columns of battery modules 12 in which no inflow channel 26 is provided, there are provided in each case outflow channels 28 which run parallel to one another and between which, likewise, in each case two columns of battery modules 12 are provided. The outflow channels 28 open out, at the side opposite the supply flow collector channel 24, into a common return flow collector channel 30, which runs in particular substantially parallel to the supply flow collector channel 24 and/or in the same flow direction as the supply flow collector channel 24. In the respective cooling segment 20, that portion of the inflow channel 26 and that portion of the outflow channel 28 which run along the battery module 12 are connected to one another via a plurality of, for example three, cooling channels 32, wherein the cooling channels 32 are coupled thermally to the battery cells 14.

Figure 2:
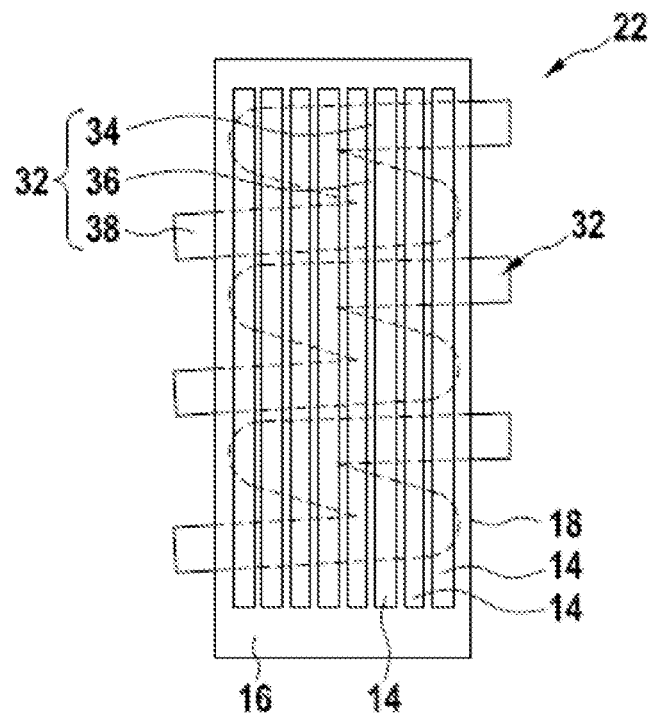
FIG. 2 shows a schematic detailed plan view of a battery module unit of the motor vehicle battery from FIG. 1.

As is illustrated in detail in FIG. 2, the cooling channels 32 have a substantially zigzag-shaped profile. in this respect, the respective cooling channel 32 has a first channel portion 34 which departs from the inflow channel 26 and which runs substantially perpendicularly to the inflow channel 26 and the outflow channel 28 and from which a second channel portion 36, with a component in the opposite flow direction with respect to the first channel portion 34, departs. The unit composed of the first channel portion 34 and the second channel portion 36 can be repeated multiple times, wherein, in the iilustrated exemplary embodiment, provision is not made for this and the second channel portion 36 is adjoined directly by a final channel portion 38 which is connected to the outflow channel 28 and which runs substantially parallel to the first channel portion 34. The cooling segment 20, with a small number of cooling channels 32, is, owing to the zigzag-shaped profile, able to cover a large cooling surface and, due to the increased turbulence as a consequence of the diversions of the cooling fluid, able to achieve a high heat transfer performance.

Figure 3:
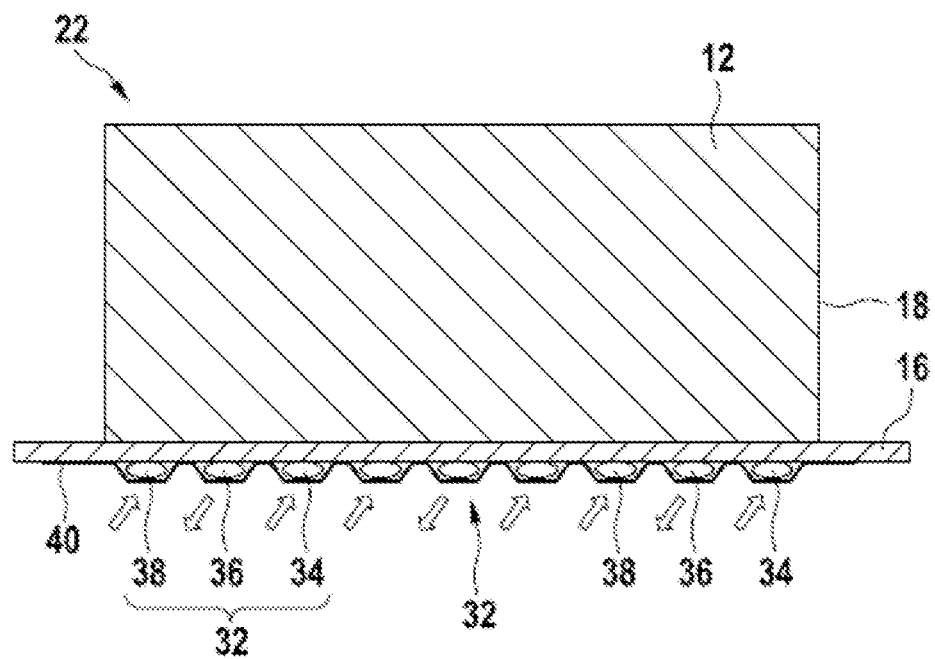
FIG. 3 shows a schematic sectional view of the battery module unit from FIG. 2 along a section A-A in FIG. 1.

As is illustrated in FIG. 3, the cooling channels 32, and also the inflow channel 26 and the outflow channel 28, may be formed by a profile 40, for example a shaped metal sheet, which is connected to the base plate 16. Via heat conduction in the base plate 16, the cooling fluid in the cooling channels 32 of the cooling segment 20 can be coupled thermally to the battery cells 14, which in particular bear directly on the base plate 16, wherein the base plate 16 can preferably achieve at least partial homogenization of a possibly occurring temperature profile along the flow direction of the cooling channel 32.

FIG. 4 shows battery module units 22, which are arranged adjacent to one another in the flow direction of the inflow channel 26 and of the outflow channel 28, that share both the same inflow channel 26 and the same outflow channel 28. The units 22 are arranged in column form, but could also be arranged in row form with minor modifications (i.e., channels 26 and 28 running horizontally instead of vertically).

What is claimed is:

1. A battery module unit for a motor vehicle battery, said battery module unit comprising:
   (i) a housing,
   (ii) a plurality of battery cells positioned in the housing and which are configured as pouch cells, and
   (iii) a base plate in thermal contact with the battery cells, said base plate comprising a cooling segment for controlling the temperature of a battery module of a motor vehicle battery, said cooling segment comprising:
      (a) an inflow channel through which a cooling fluid can be fed,
      (b) an outflow channel configured for discharging the cooling fluid, and which is spaced apart from the inflow channel, and
      (c) a plurality of cooling channels which communicate with the inflow channel and the outflow channel,
      wherein each respective cooling channel has (i) a first channel portion which is fluidly connected directly to the inflow channel and which partially extends toward the outflow channel, (ii) a second channel portion which is fluidly connected directly to the first channel portion and which extends away from the outflow channel and at least partially toward the inflow channel, and (iii) a final portion which is fluidly connected either directly or indirectly to the second channel portion and is fluidly connected directly to the outflow channel, wherein the plurality of cooling channels are arranged in at least two columns and at least two rows, wherein the first channel portion of the plurality of cooling channels are all directly fluidly connected to the same inflow channel, and wherein the inflow channel extends between the at least two columns of cooling channels and fluidly and directly intersects the at least two rows of cooling channels, and the inflow channel is directly and separately fluidly connected to each of the first channel portions of the plurality of cooling channels that are arranged in at least two columns and at least two rows.

2. The battery module unit as claimed in claim 1, wherein the respective cooling channel has at least one zigzag profile.

3. The battery module unit as claimed in claim 1, wherein the inflow channel and the outflow channel run spaced apart from one another and substantially parallel to one another, wherein the first portion and the final portion of the respective cooling channel run spaced apart from one another and substantially parallel to one another, and the second channel portion runs at an angle to the inflow channel, the outflow channel, the first channel portion and the final channel portion.

4. The battery module unit as claimed in claim 1, wherein the inflow channel, the outflow channel and the cooling channels are formed substantially in a plane.

5. The battery module unit as claimed in claim 1, wherein the inflow channel and the outflow channel are formed offset from the battery cells.

6. The battery module unit as claimed in claim 1, wherein the first channel portion, the second channel portion and the final channel portion are coupled thermally to all of the battery cells.

7. A motor vehicle battery for an electrically driveable motor vehicle, said motor vehicle battery comprising a plurality of the battery module units as claimed in claim 1, said battery module unit being arranged in rows and/or in columns.

8. The motor vehicle battery as claimed in claim 7, wherein the battery module units, which are arranged adjacent to one another transversely to the flow direction of the inflow channel and of the outflow channel, share the same inflow channel or the same outflow channel.

9. The motor vehicle battery as claimed in claim 7, wherein the battery module units, which are arranged adjacent to one another in the flow direction of the inflow channel and of the outflow channel, share both the same inflow channel and the same outflow channel.

10. An electrically driveable motor vehicle comprising the motor vehicle battery of claim 7.

11. The motor vehicle battery as claimed in claim 1, wherein the cooling segment is disposed on a bottom side of the base plate, and the housing is mounted to a top side of the base plate.

12. The motor vehicle battery as claimed in claim 1, wherein the cooling segment is mounted on the plate, wherein the inflow channel, outflow channel and cooling channels are all disposed on the plate.

13. The motor vehicle battery as claimed in claim 1, further comprising a plurality of outlet flow channels, wherein the outflow channels are connected to a common return flow connector channel disposed on the base plate.

14. The motor vehicle battery as claimed in claim 1, further comprising a plurality of outlet flow channels and a plurality of inflow channels, wherein the outflow channels and inflow channels are arranged in parallel on the baseplate.

15. The motor vehicle battery as claimed in claim 14, wherein the battery cells are arranged in parallel to the outflow channels and the inflow channels.

16. The motor vehicle battery as claimed in claim 14, wherein, for each inflow channel, one of the cooling channels is positioned on each side of the respective inflow channel.

* * * * *